(12) United States Patent
Patel et al.

(10) Patent No.: US 11,391,897 B2
(45) Date of Patent: Jul. 19, 2022

(54) STIFFENER DEVICE PROVIDING EXTERNAL CONNECTIONS TO CO-PACKAGED OPTICAL DEVICES

(71) Applicant: Cisco Technology, Inc., San Jose, CA (US)

(72) Inventors: Vipulkumar K. Patel, Breinigsville, PA (US); Paul Ton, San Jose, CA (US); Aparna R. Prasad, San Jose, CA (US); Norbert Schlepple, Allentown, PA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 17/133,407

(22) Filed: Dec. 23, 2020

(65) Prior Publication Data

US 2022/0196933 A1  Jun. 23, 2022

(51) Int. Cl.
*G02B 6/42* (2006.01)

(52) U.S. Cl.
CPC ............ *G02B 6/426* (2013.01); *G02B 6/428* (2013.01); *G02B 6/4278* (2013.01); *G02B 6/4284* (2013.01); *G02B 6/4269* (2013.01)

(58) Field of Classification Search
None
See application file for complete search history.

(56) References Cited

U.S. PATENT DOCUMENTS

| | | | | |
|---|---|---|---|---|
| 5,054,870 A | * | 10/1991 | Losch | ...... G02B 6/43 385/14 |
| 2003/0072537 A1 | * | 4/2003 | Eichenberger | ....... G02B 6/3807 385/89 |
| 2007/0258683 A1 | * | 11/2007 | Rolston | ........ G02B 6/43 385/88 |
| 2011/0217008 A1 | | 9/2011 | Cline et al. | |
| 2012/0207427 A1 | | 8/2012 | Ito | |
| 2012/0207437 A1 | | 8/2012 | Kang et al. | |
| 2014/0203175 A1 | * | 7/2014 | Kobrinsky | ............. H01L 24/83 250/214.1 |
| 2018/0306990 A1 | * | 10/2018 | Badihi | ........... G02B 6/4452 |

(Continued)

FOREIGN PATENT DOCUMENTS

WO    WO-2017132481 A1 *   8/2017   ........... G02B 6/4226

OTHER PUBLICATIONS

"Intel Demonstrates Industry-First Co-Packaged Optics Ethernet Switch." Intel Newsroom, Mar. 5, 2020, https://newsroom.intel.com/news/intel-demonstrates-industry-first-co-packaged-optics-ethernet-switch/#gs.7wzkxp.

(Continued)

*Primary Examiner* — Michelle R Connelly
(74) *Attorney, Agent, or Firm* — Patterson + Sheridan, LLP

(57) ABSTRACT

Aspects described herein include an apparatus comprising a substrate, an electronic integrated circuit (IC) disposed on the substrate, one or more optical ICs disposed on the substrate and communicatively coupled with the electronic IC, and a stiffener device attached to the substrate. The stiffener device comprises a stiffener ring that substantially circumscribes the one or more optical ICs. The stiffener device defines one or more features configured to receive a plurality of light-carrying media that optically couple with the one or more optical ICs and that extend to one or more lateral edges of the stiffener device.

20 Claims, 10 Drawing Sheets

(56) References Cited

U.S. PATENT DOCUMENTS

2020/0310054 A1    10/2020  Epitaux et al.
2021/0088723 A1*   3/2021   Yu ..................... G02B 6/12004
2021/0263236 A1*   8/2021   Janta-Polczynski .......................
                                                         G02B 6/3897

OTHER PUBLICATIONS

"Rockley Photonics Demonstrates in-Package Optics Platform to Select Partners." Fibre Systems, Mar. 19, 2018, https://www.fibre-systems.com/news/rockley-photonics-demonstrates-package-optics-platform-select-partners.

* cited by examiner

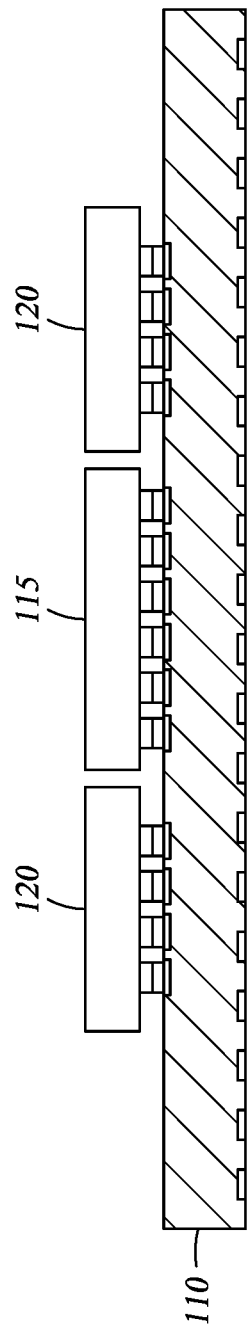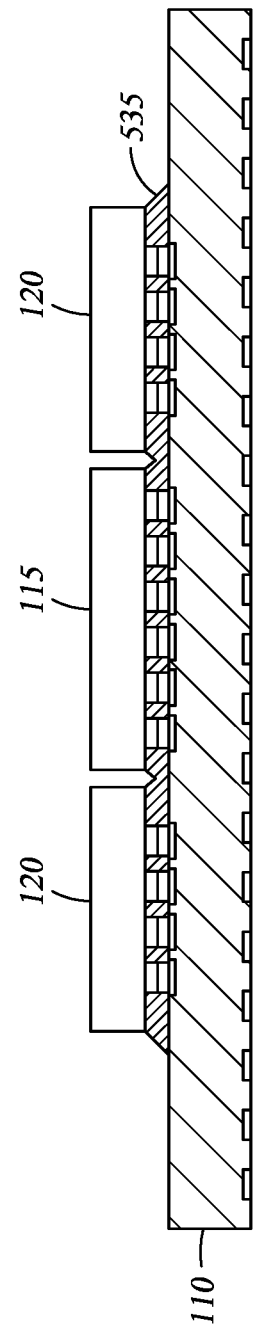

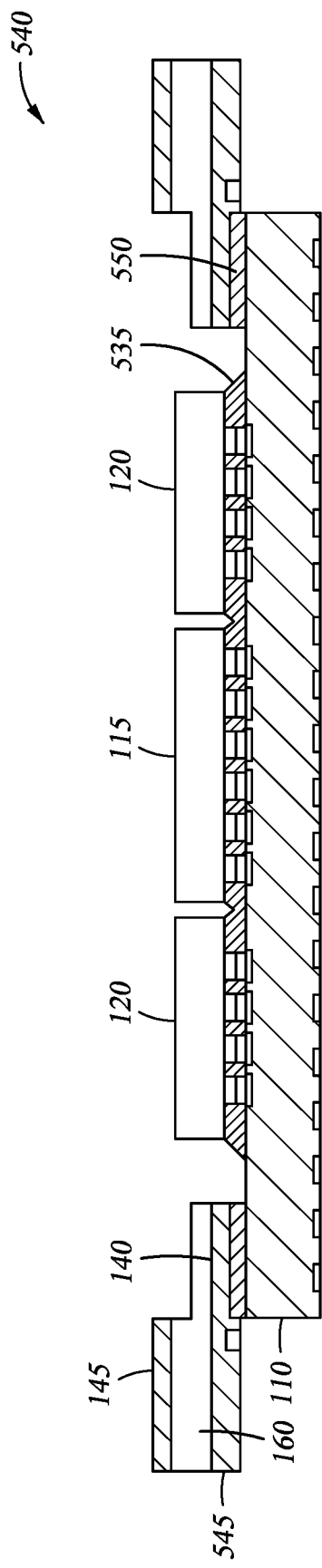
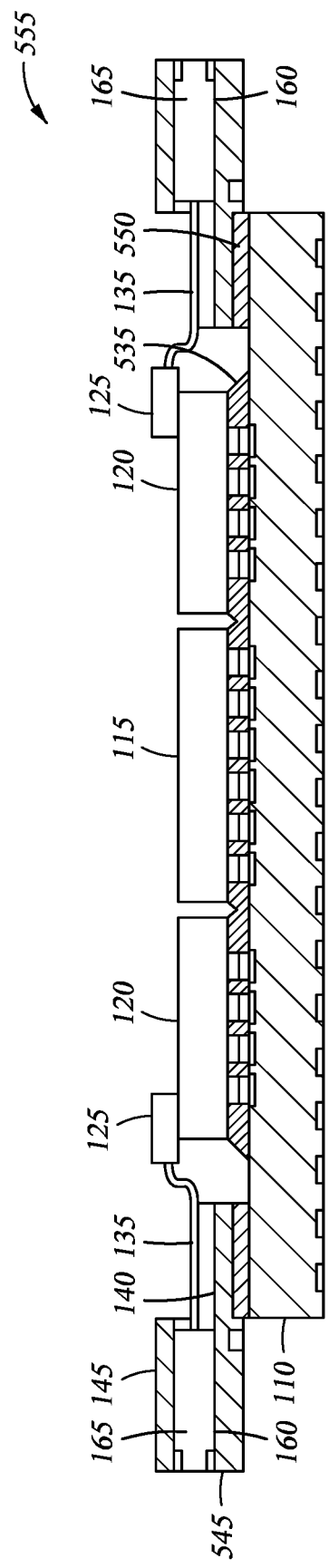

US 11,391,897 B2

STIFFENER DEVICE PROVIDING EXTERNAL CONNECTIONS TO CO-PACKAGED OPTICAL DEVICES

TECHNICAL FIELD

Embodiments presented in this disclosure generally relate to co-packaged optical (CPO) devices, and more specifically, to stiffener devices providing external connections to co-packaged optical devices.

BACKGROUND

Fabrication of co-packaged optical (CPO) devices may be challenging as it typically requires an integration of diverse components and processes. For example, co-packaged optical devices may include one or more electronic integrated circuits (ICs) and one or more optical engines, which may include digital signal processors, silicon photonics, and/or external optical connections (such as fiber array units arranging a plurality of optical fibers). Some examples of fabrication processes include package assembly, optical fiber attachment, and/or printed circuit board and socket assembly.

Manufacturing CPO devices using ball-grid array (BGA) direct-attachment techniques may also be challenging due to the large BGA body size packaging and due to high-temperature exposures during board assembly reflow processes. More specifically, assembly processes for optical components may rely on epoxies that are not compatible with high-temperature manufacturing processes. Thus, the assembly process may need to be altered such that the optical components are attached after all high-temperature processors are completed.

Further, additional hardware included in the CPO devices such as socket peripheral hardware, thermal cooling hardware, and/or stiffener hardware may complicate the attachment and/or routing of external connections to the CPO devices. For example, a stiffener ring may contact a load plate, and the assembly of the stiffener ring and the load plate may effectively seal the package from external connections.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

FIG. 5A-5G illustrate a sequence of fabricating an optical apparatus with a stiffener device, according to one or more embodiments.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

Figure 1A:
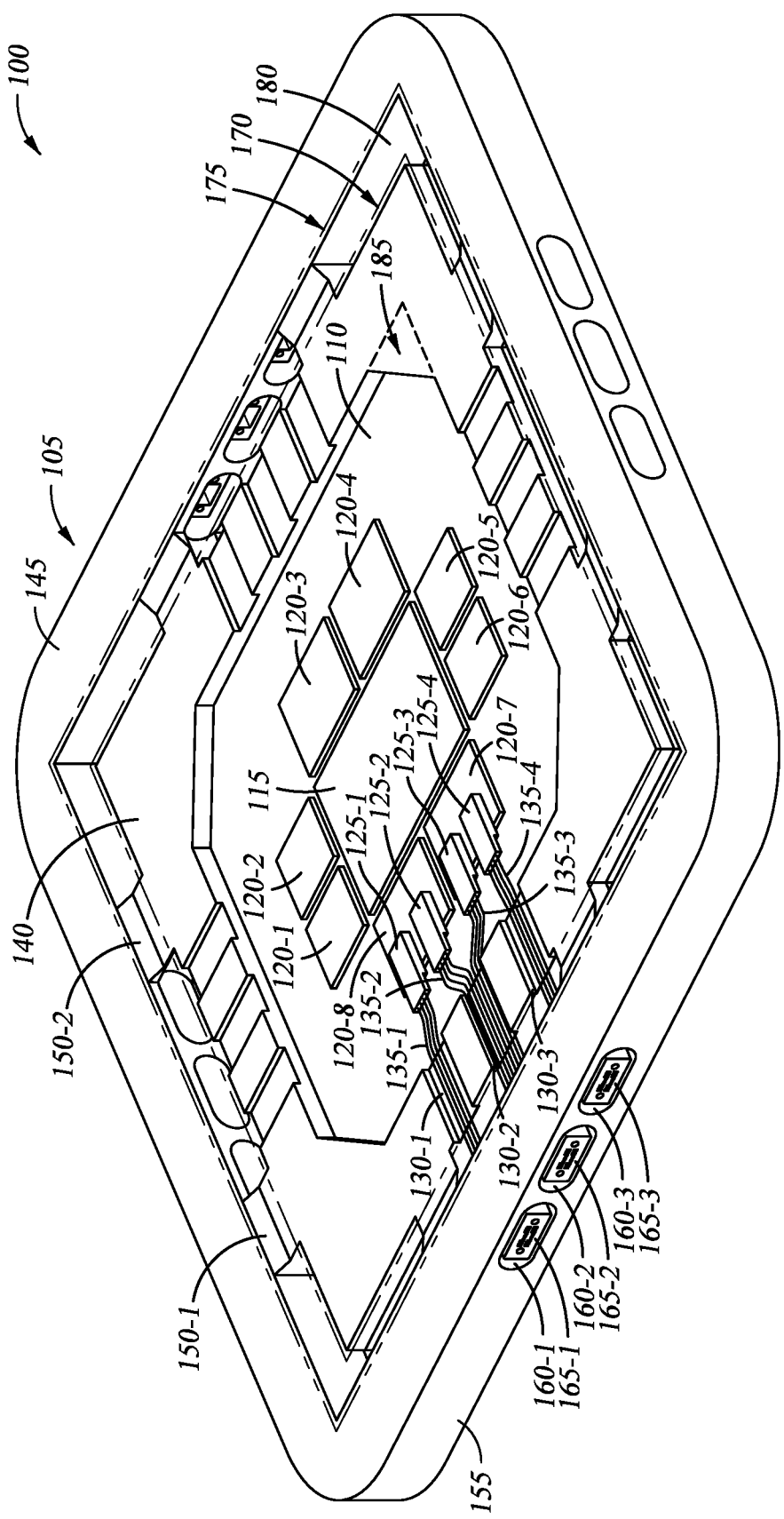
FIG. 1A is a diagram of an apparatus having a stiffener device with an inner stiffener ring and a continuous outer stiffener ring, according to one or more embodiments.

One embodiment presented in this disclosure is an apparatus comprising a substrate, an electronic integrated circuit (IC) disposed on the substrate, one or more optical ICs disposed on the substrate and communicatively coupled with the electronic IC, and a stiffener device attached to the substrate. The stiffener device comprises a stiffener ring that substantially circumscribes the one or more optical ICs. The stiffener device defines one or more features configured to receive a plurality of light-carrying media that optically couple with the one or more optical ICs and that extend to one or more lateral edges of the stiffener device.

One embodiment presented in this disclosure is a method of fabricating an optical apparatus. The method comprises attaching a stiffener device to a substrate. An electronic integrated circuit (IC) and one or more optical ICs are arranged on the substrate. The stiffener device comprises a stiffener ring that substantially circumscribes the one or more optical ICs. The method further comprises receiving a plurality of light-carrying media in one or more features defined in the stiffener device, and optically coupling the plurality of light-carrying media to the one or more optical ICs. The plurality of light-carrying media extend, from the one or more optical ICs, toward one or more lateral edges of the stiffener device.

One embodiment presented in this disclosure is a stiffener device for a substrate having one or more integrated circuits (ICs) disposed on a surface of the substrate. The stiffener device comprises a stiffener ring dimensioned to substantially circumscribe the one or more ICs when the stiffener ring is attached to the surface. The stiffener ring defines one or more features that support one or more external connections to the one or more ICs through one or more lateral edges of the stiffener device.

Example Embodiments

To achieve higher-power operation, CPO devices may include a stiffener ring. However, a top-side area of the stiffener ring may not be accessible due to placement of a heatsink and/or socket peripheral hardware assemblies, which poses challenges for providing access for optical fibers to the optical ICs of the CPO devices.

Embodiments described herein include an apparatus comprising a substrate, an electronic integrated circuit (IC) disposed on the substrate, and one or more optical ICs disposed on the substrate and communicatively coupled with the electronic IC. The apparatus further comprises a stiffener device attached to the substrate. The stiffener device comprises a stiffener ring that substantially circumscribes the one or more optical ICs. The stiffener device defines one or more features configured to receive a plurality of light-carrying media that optically couple with the one or more optical ICs and that extend to one or more lateral edges of the stiffener device.

In some embodiments, the stiffener device comprises multiple stiffener rings. An inner stiffener ring substantially circumscribes the one or more optical ICs, and an outer stiffener ring is attached to, and substantially circumscribes, the inner stiffener ring. The inner stiffener ring and/or the outer stiffener ring may be continuous or may include one or more discontinuities. In some embodiments, the inner stiffener ring and the outer stiffener ring may be coplanar with each other.

In some embodiments, the one or more features comprise a plurality of trenches extending from a top surface of the inner stiffener ring, and/or a plurality of openings extending laterally through the outer stiffener ring to the one or more lateral edges of the stiffener device. In some embodiments, the outer stiffener ring has a first thickness that is greater than a second thickness of the inner stiffener ring. Beneficially, the greater first thickness of the outer stiffener ring may provide mechanical support to the inner stiffener ring at locations where the inner stiffener ring is relatively weaker due to the plurality of trenches.

Each opening of the plurality of openings may be dimensioned to receive a respective optical connector that optically couples with one or more of the plurality of light-carrying media. The outer stiffener ring may comprise one or more mechanical alignment features at each opening for attaching the respective optical connector to the outer stiffener ring.

Beneficially, use of the stiffener devices described herein solves the technical problem of routing optical fibers and/or waveguides into and/or out of CPO devices, and may further support routing within the CPO devices. In some cases, optical connectors may be integrated into a stiffener ring of the CPO devices, which supports an assembly flow that allows manufacturing, testing, handling, and/or shipping of an entire CPO device (including optical alignment) prior to attaching the CPO device to socket. In some cases, use of the optical fibers and/or waveguides provides mechanical isolation between relatively high-force optical connectors and the pressure-sensitive optical coupling between a FAU and optical IC. The stiffener devices described herein may further improve performance of the CPO devices in terms of coplanarity and warpage.

FIG. 1A is a diagram of an apparatus 100 having a stiffener device 105 with an inner stiffener ring 140 and a continuous outer stiffener ring 145, according to one or more embodiments.

The apparatus 100 further comprises a substrate 110 having an electronic integrated circuit (IC) 115 and one or more optical ICs 120-1, 120-2, . . . , 120-8 (generically or collectively, optical IC(s) 120) disposed thereon. The electronic IC 115 and the optical ICs 120 may have any suitable functionality. Further, one or more additional components may be disposed on the substrate 110. As shown, the electronic IC 115 is centrally located on the substrate 110 and the optical ICs 120 are arranged laterally outward from the electronic IC 115. Other arrangements of the electronic IC 115 and the optical ICs 120 are also contemplated.

The substrate 110 may comprise one or more layers such as conductive layer(s), semiconductor layer(s), and/or insulator layer(s). In some embodiments, the substrate 110 provides conductive connections between the electronic IC 115 and the optical ICs 120. In some embodiments, the substrate 110 may include one or more conductive vias extending between layers and/or extending to a top surface and/or a bottom surface of the substrate 110. For example, the substrate 110 may include first conductive connections on a top surface of the substrate 110, second conductive connections on a bottom surface of the substrate 110, and conductive vias connecting the first and second conductive connections. In this way, the electronic IC 115 and the optical ICs 120 may be mounted on the top surface and connected through the substrate 110 to a printed circuit board (PCB) or other device connected to the bottom surface.

The stiffener device 105 comprises one or more stiffener rings formed of any suitable material(s). As shown, the stiffener device 105 comprises two stiffener rings: the inner stiffener ring 140 that substantially circumscribes the one or more optical ICs 120, and the outer stiffener ring 145 that is attached to, and that substantially circumscribes, the inner stiffener ring 140. In some embodiments, the inner stiffener ring 140 and the outer stiffener ring 145 are concentric, but other arrangements are also contemplated. In some embodiments, the inner stiffener ring 140 and the outer stiffener ring 145 may be coplanar with each other, although this is not a requirement.

The stiffener device 105 may be formed of any suitable material(s) and may have any suitable dimensioning for stiffening the substrate 110, including an exterior contouring of the inner stiffener ring 140 and the outer stiffener ring 145. As shown, the inner stiffener ring 140 is substantially rectangular, and the outer stiffener ring 145 is substantially rounded rectangular. A plurality of lateral projections 150-1, 150-2 attach the outer stiffener ring 145 to the inner stiffener ring 140. The inner stiffener ring 140 and/or the outer stiffener ring 145 may be continuous or may include one or more discontinuities. In some embodiments, the inner stiffener ring 140, the outer stiffener ring 145, and the lateral projections 150-1, 150-2 are monolithically formed of copper. In other embodiments, the stiffener device 105 may be formed of other material(s) and/or may be formed of multiple attached parts.

The stiffener device 105 attaches to the substrate 110 using any suitable techniques. As shown, the inner stiffener ring 140 attaches to lateral portions of the substrate 110. In some embodiments, an epoxy is applied and cured to rigidly attach the substrate 110 to the inner stiffener ring 140. In some embodiments, the inner stiffener ring 140 has a substantially constant width as it extends over the lateral portions of the substrate 110. In other embodiments, the inner stiffener ring 140 may include sections of increased width that provide additional strength to stiffen the substrate 110. As shown, the inner stiffener ring 140 includes corner projections 185 extending between elongated portions.

In the apparatus 100, the inner stiffener ring 140 and the outer stiffener ring 145 are continuous. Stated another way, each of the inner stiffener ring 140 and the outer stiffener ring 145 have continuous outer perimeters. In other implementations, one or both of the inner stiffener ring 140 and the outer stiffener ring 145 include one or more discontinuities. For example, apparatus 200 of FIG. 2, the inner stiffener ring 140 of a stiffener device 205 is continuous while the outer perimeter of the outer stiffener ring 145 of the stiffener device 205 includes discontinuities. In some embodiments, the outer stiffener ring 145 comprises sections 210-1, 210-2, 210-3, 210-4 (generically or collectively, section(s) 210) arranged along different sides of the inner stiffener ring 140 and/or the substrate 110.

The stiffener device 105 supports one or more external connections to the ICs (e.g., the electronic IC 115 and/or the optical ICs 120) through one or more lateral edges 155 of the stiffener device 105. The one or more external connections to the ICs may comprise optical connection(s) and/or conductive connection(s). In some embodiments, the inner stiffener ring 140 and/or the outer stiffener ring 145 define one or more features that support the one or more external connections through the one or more lateral edges 155.

In some embodiments, the one or more features comprises a plurality of trenches 130-1, 130-2, 130-3 (generically or collectively, trench(es) 130) extending from a top surface of the inner stiffener ring 140, and/or a plurality of openings 160-1, 160-2, 160-3 (generically or collectively, opening(s) 160) extending laterally through the outer stiffener ring 145 to the one or more lateral edges 155 of the stiffener device 105.

As discussed above, alternate implementations of the stiffener device 105 may include a different number of stiffener rings. For example, an alternate implementation may have a single stiffener ring that includes the trenches 130 and/or the openings 160 to support the one or more external connections through the one or more lateral edges 155.

The stiffness of the outer stiffener ring 145 may augment the stiffness of the inner stiffener ring 140. In some embodiments, the stiffness of the outer stiffener ring 145 compensates for locations where the inner stiffener ring 140 is relatively less stiff, e.g., due to the reduced thickness at the plurality of trenches 130.

Figure 2:
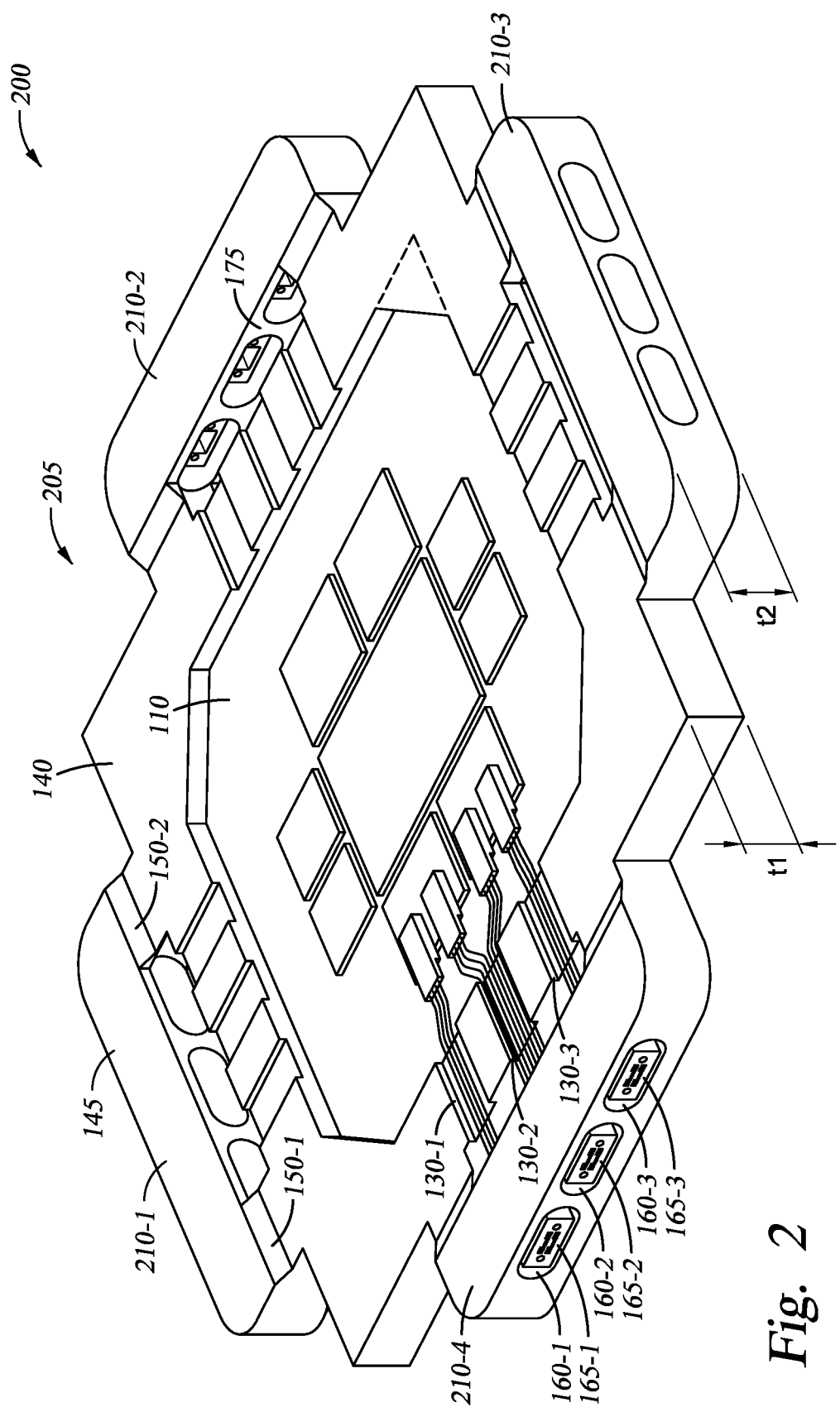
FIG. 2 is a diagram of an apparatus having a stiffener device with an inner stiffener ring and an outer stiffener ring with discontinuities, according to one or more embodiments.

In some embodiments, and as shown in FIG. 2, the outer stiffener ring 145 has a first thickness t2 that is greater than a second thickness t1 of the inner stiffener ring 140. Beneficially, the greater first thickness t2 of the outer stiffener ring 145 may enable the integration of additional features such as optical connectors, as well as provide mechanical support to the inner stiffener ring 140 at locations where the inner stiffener ring 140 is relatively less stiff.

In some embodiments, the placement of the connections of the inner stiffener ring 140 and the outer stiffener ring 145 (e.g., the lateral projections 150-1, 150-2) may "focus" the augmentation near the locations where the inner stiffener ring 140 is relatively less stiff. As shown in FIGS. 1A and 2, the lateral projections 150-1, 150-2 are arranged along lateral edges of the inner stiffener ring 140 proximate to the trenches 130 and the openings 160. In FIG. 2, the sections 210 of the outer stiffener ring 145 may have a lateral extent (relative to the one or more lateral edges 155) defined by the lateral projections 150-1, 150-2.

In some embodiments, a plurality of light-carrying media optically couple with the one or more optical ICs 120 and extend to the one or more lateral edges 155 of the stiffener device 105. In some embodiments, the plurality of light-carrying media comprise one or both of optical fibers 135-1, 135-2, 135-3, 135-4 (generically or collectively, optical fibers 135) and flexible waveguides (e.g., waveguides arranged on a flexible substrate). Beneficially, the optical fibers 135 and/or flexible waveguides may operate as mechanical force buffers or decouplers between the optical ICs 120 and external optical connections to the apparatus 100.

In some embodiments, the plurality of light-carrying media comprise optical fibers 135 that are optically coupled with the one or more optical ICs 120 using one or more fiber array units (FAUs) 125-1, 125-2, 125-3, 125-4 (generically or collectively, FAU(s) 125). In some embodiments, each FAU 125 provides an arrangement of one or more optical fibers 135 to assist with the optical coupling. For example, a plurality of optical fibers 135 may be pressed into grooves of the FAU 125 to arrange the optical fibers 135 with a desired pitch.

As shown, two (2) FAUs 125-1, 125-2 are attached to the optical IC 120-8 and two (2) FAUs 125-3, 125-4 are attached to the optical IC 120-7. Although not shown, one or more FAUs may be attached to the other optical ICs 120.

Each FAU 125 may be optically aligned with, and attached to, the respective optical IC 120 using any suitable techniques. For example, the FAU 125 may be optically aligned with optical waveguides of the respective optical IC 120 using passive and/or active optical alignment techniques known to the person of ordinary skill, and an epoxy or other adhesive may be applied while the FAU 125 and the optical IC 120 are in an optically aligned position. Some non-limiting examples of the optical alignment include edge coupling, surface coupling, and evanescent coupling.

A first group of optical fibers 135-1 is optically coupled with the optical IC 120-8 via the FAU 125-1, a second group of optical fibers 135-2 is optically coupled with the optical IC 120-8 via the FAU 125-2, a third group of optical fibers 135-3 is optically coupled with the optical IC 120-7 via the FAU 125-3, and a fourth group of optical fibers 135-4 is optically coupled with the optical IC 120-7 via the FAU 125-4.

Figure 1B:
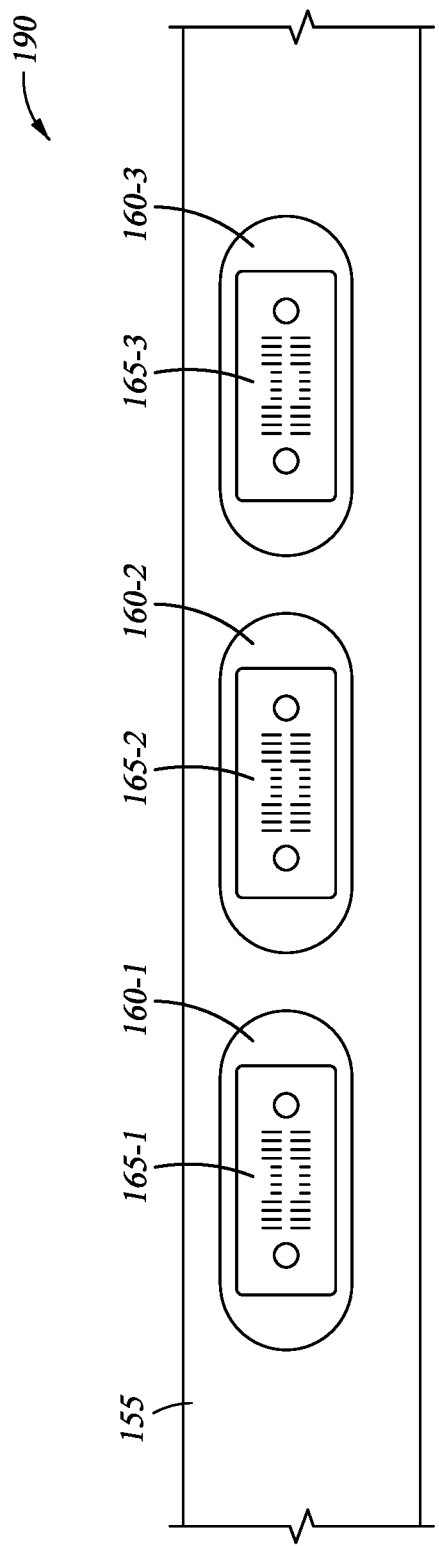
FIG. 1B is a diagram illustrating optical connectors attached to an outer stiffener ring, according to one or more embodiments.

The optical fibers 135-1 extend through the trench 130-1 and partly through the opening 160-1, and optically couple with an optical connector 165-1 (generically or collectively, optical connector(s) 165) arranged near the one or more lateral edges 155 of the stiffener device 105. The optical fibers 135-2, 135-3 extend through the trench 130-2 and partly through the opening 160-2, and optically couple with an optical connector 165-2. The optical fibers 135-4 extend through the trench 130-3 and partly through the opening 160-3, and optically couple with an optical connector 165-3. Diagram 190 of FIG. 1B provides a side view of the optical connectors 165.

In some embodiments, each opening 160 is dimensioned to receive a respective optical connector 165 that optically couples with one or more of the plurality of light-carrying media. The optical connectors 165 may be standardized or proprietary connectors. In some embodiments, the outer stiffener ring 145 comprises one or more alignment features at each opening 160 for attaching the respective optical connector 165 to the outer stiffener ring 145. In some embodiments, the one or more alignment features comprise mechanical alignment features, such as grooves for receiving the optical connectors 165, stops for limiting motion of the optical connectors 165, and so forth. In some embodiments, the one or more alignment features comprise optical alignment features, such as fiducial marks that guide placement of the optical connectors 165 by an optical manufacturing system.

A plurality of openings 180 are defined between an outer perimeter 170 of the inner stiffener ring 140 and an inner perimeter 175 of the outer stiffener ring 145. In some embodiments, the openings 180 are further defined by the lateral projections 150-1, 150-2 extending between the inner stiffener ring 140 and the outer stiffener ring 145. In some embodiments, the openings 180 may be used for connector assembly and/or routing of the optical fibers 135. In some embodiments, the openings 180 may be used for interaction of the optical apparatus with a wall of a socket. For example, the socket may be attached to a printed circuit board (PCB) and configured to receive the substrate 110, and the inner stiffener ring 140 is dimensioned to contact the socket when the substrate 110 is received in the socket.

In some embodiments, the stiffener device 105, 205 comprises one or more alignment features that align the substrate 110 when being received in the socket. For example, the lateral edges of the inner stiffener ring 140 may be contoured with one or more first features that are complementary to one or more second features of the substrate 110, such that the first features and the second features mate, slidingly contact, etc. to guide the motion of the substrate 110 when received into the socket.

Although the optical fibers 135 are described as extending to the optical connectors 165, alternate implementations may have the optical fibers 135 extending through the openings 160 (that is, extending past the one or more lateral edges 155 of the stiffener device 105). Further, although described primarily in terms of the optical fibers 135 and the optical connectors 165, alternate implementations may include electrical connections (e.g., wires) and/or electrical connectors routed through the trenches 130 and/or the openings 160 of the stiffener device 105.

Figure 3:
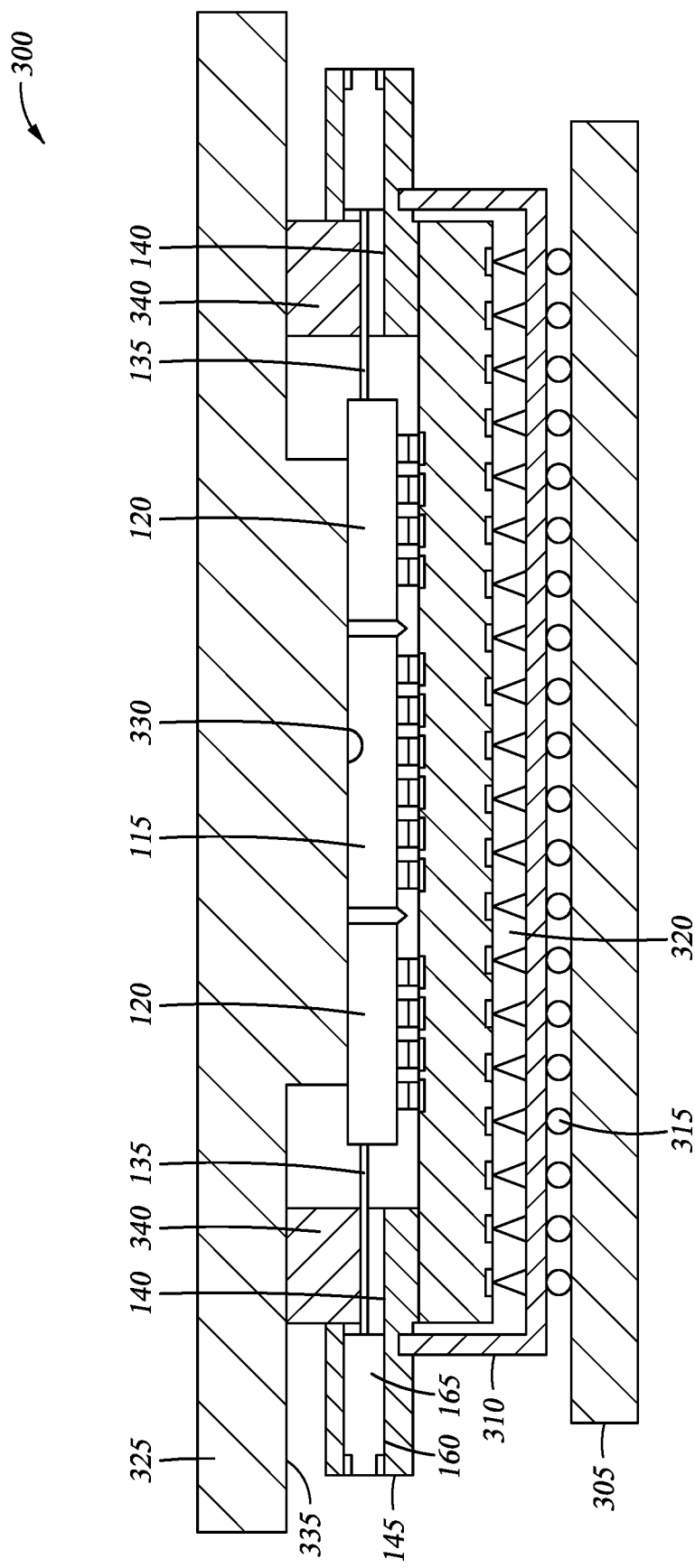
FIG. 3 is a cross-sectional view of an apparatus having a stiffener device with an inner stiffener ring and an outer stiffener ring, according to one or more embodiments.

FIG. 3 is a cross-sectional view 300 of an apparatus having a stiffener device with an inner stiffener ring 140 and an outer stiffener ring 145, according to one or more embodiments. The features illustrated in the view 300 may be used in conjunction with other embodiments. For example, the view 300 may represent the apparatus 100 of FIG. 1 or the apparatus 200 of FIG. 2 when inserted in a socket 310.

In the view 300, a socket 310 is attached to a PCB 305. The socket 310 may be a standardized or proprietary socket. The socket 310 comprises external conductive connections, such as a ball grid array 315, for connecting to corresponding conductive connections of the PCB 305. The socket 310 further comprises internal conductive connections, such as contact pins 320, for connecting to corresponding conductive connections of the substrate 110.

In the view 300, a cooling plate 325 is disposed above the apparatus and configured to passively and/or actively remove heat from the apparatus. As shown, a first surface 330 of the cooling plate 325 contacts top surfaces of the electronic IC 115 and/or the optical ICs 120. In some embodiments, a load plate 340 is disposed above the inner stiffener ring 140, and a second surface 335 of the cooling plate 325 contacts a top surface of the load plate 340.

In some embodiments, the inner stiffener ring 140 is dimensioned to contact the socket 310 when the substrate 110 is received in the socket 310. For example, lateral edges of the substrate 110 and the inner stiffener ring 140 may contact sidewalls of the socket 310. As discussed above, the outer stiffener ring 145 may have a first thickness that is greater than a second thickness of the inner stiffener ring 140 to reinforce the inner stiffener ring 140.

Figure 4:
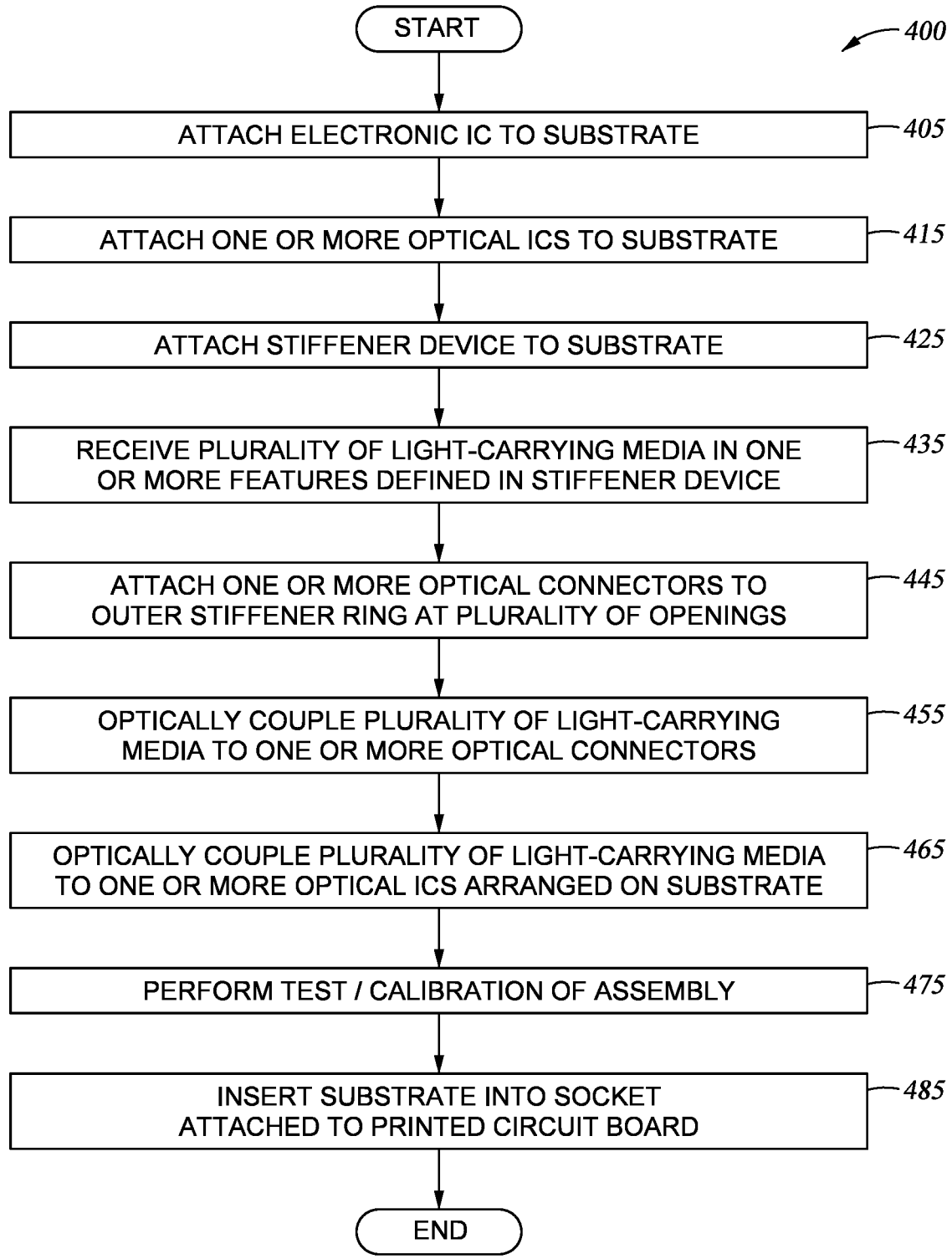
FIG. 4 is a method of fabricating an optical apparatus with a stiffener device, according to one or more embodiments.

FIG. 4 is a method 400 of fabricating an optical apparatus with a stiffener device, according to one or more embodiments. The method 400 may be used in conjunction with other embodiments, for example, to fabricate the apparatus 100 of FIG. 1A or the apparatus 200 of FIG. 2.

The method 400 begins at block 405, where an electronic IC is attached to a substrate. At block 415, one or more optical ICs are attached to the substrate. At block 425, a stiffener device is attached to the substrate. In some embodiments, attaching the stiffener device comprises applying an epoxy or other adhesive between a stiffener ring of the stiffener device and the substrate.

At block 435, the substrate is inserted into a socket attached to a printed circuit board. In some embodiments, the stiffener device comprises one or more alignment features that align the substrate when being received in the socket.

At block 445, a plurality of light-carrying media are received in one or more features defined in the stiffener device. In some embodiments, the light-carrying media comprises one or both of optical fibers and flexible waveguides. In some embodiments, the one or more features comprises a plurality of trenches and/or a plurality of openings extending laterally through the stiffener device to one or more lateral edges of the stiffener device.

At block 455, one or more optical connectors are attached to an outer stiffener ring of the stiffener device at the plurality of openings. In some embodiments, the outer stiffener ring comprises one or more mechanical and/or optical alignment features at the plurality of openings that assist with attaching the one or more optical connectors.

At block 465, the plurality of light-carrying media are optically coupled to the one or more optical connectors. At block 475, the plurality of light-carrying media are optically coupled to one or more optical ICs arranged on the substrate. In some embodiments, optically coupling the plurality of light-carrying media to the one or more optical ICs comprises attaching the plurality of light-carrying media to one or more FAUs, and attaching the one or more FAUs to the one or more optical ICs. The method 400 ends following block 475.

FIGS. 5A-5G illustrate a sequence of fabricating an optical apparatus with a stiffener device, according to one or more embodiments. The features illustrated in FIGS. 5A-5G may be used in conjunction with other embodiments, for example, to fabricate the apparatus 100 of FIG. 1 or the apparatus 200 of FIG. 2.

Figure 5A:
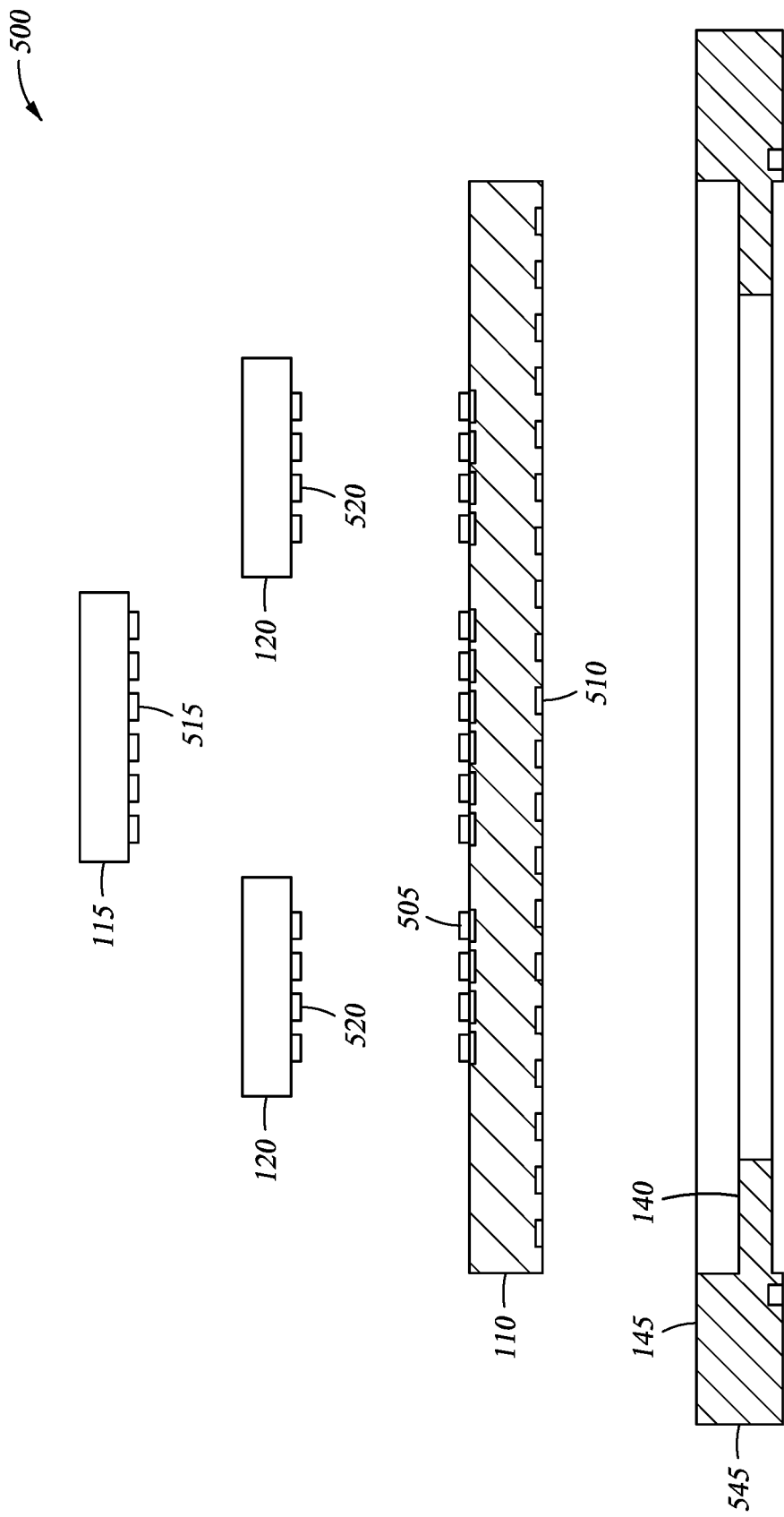

In diagram 500 of FIG. 5A, the substrate 110, the electronic IC 115, one or more optical ICs 120, and a stiffener device 545 are received. The substrate 110 comprises one or more layers, conductive connectors 505 at a first surface of the substrate 110, and conductive connectors 510 at a second surface of the substrate 110. The electronic IC 115 comprises conductive connectors 515, and the optical IC 120 comprises conductive connectors 520. The stiffener device 545 may represent the stiffener device 105 of FIG. 1 or the stiffener device 205 of FIG. 2.

In diagram 525 of FIG. 5B, the electronic IC 115 and the one or more optical ICs 120 are attached to the substrate 110. In some embodiments, the conductive connectors 515, 520 of the respective electronic IC 115 and the one or more optical ICs 120 are coupled to the conductive connectors 505 of the substrate 110. In some embodiments, the conductive connectors 505, 515, 520 are coupled using flip chip attachment techniques such as mass reflow or thermocompression bonding.

In diagram 530 of FIG. 5C, underfill 535 is added between the substrate 110 and the electronic IC 115 and the one or more optical ICs 120, using an underfill dispense process known to the person of ordinary skill. Generally, the underfill 535 compensates for differences in coefficients of thermal expansion between the substrate 110 and the electronic IC 115 and the one or more optical ICs 120. The underfill 535 also protects the conductive connectors 505, 515, 520 from environmental contaminants.

In diagram 540 of FIG. 5D, the stiffener device 545 is attached to the substrate 110. In some embodiments, an epoxy interface 550 is applied between the inner stiffener ring 140 and lateral portions of the substrate 110. The epoxy may be cured to rigidly attach the stiffener device 545 and the substrate 110. In alternate embodiments, the electronic IC 115, the one or more optical ICs 120, and the stiffener device 545 may be attached to the substrate 110 with a different ordering.

In diagram 555 of FIG. 5E, optical fibers 135 are attached to FAUs 125, and the FAUs 125 are attached to the optical ICs 120. The optical fibers 135 are also attached to optical connectors 165 that are arranged in the outer stiffener ring 145. In some embodiments, testing, tuning, and/or calibration may be performed using the assembly of the diagram 555, prior to insertion into the socket 310.

Figure 5F:
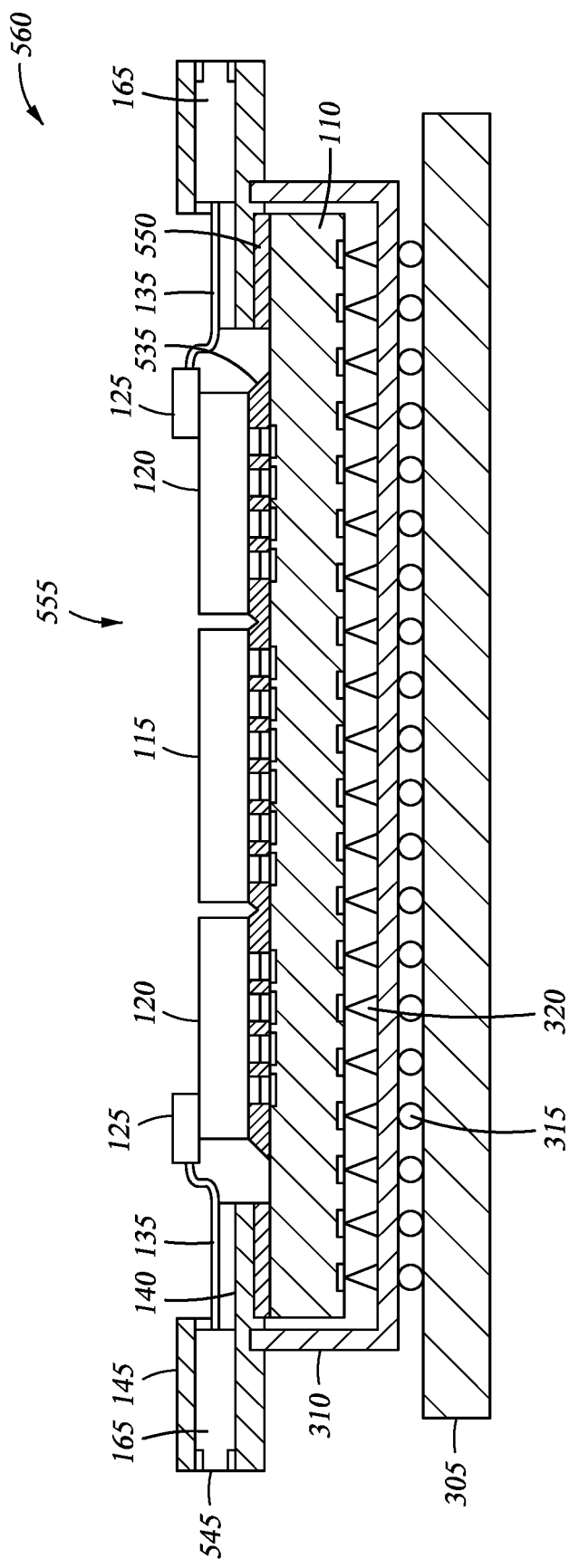

In diagram 560 of FIG. 5F, the assembly of diagram 555 is inserted into the socket 310. In some embodiments, the inner stiffener ring 140 is dimensioned to contact the socket 310 when the substrate 110 is received in the socket 310.

Figure 5G:
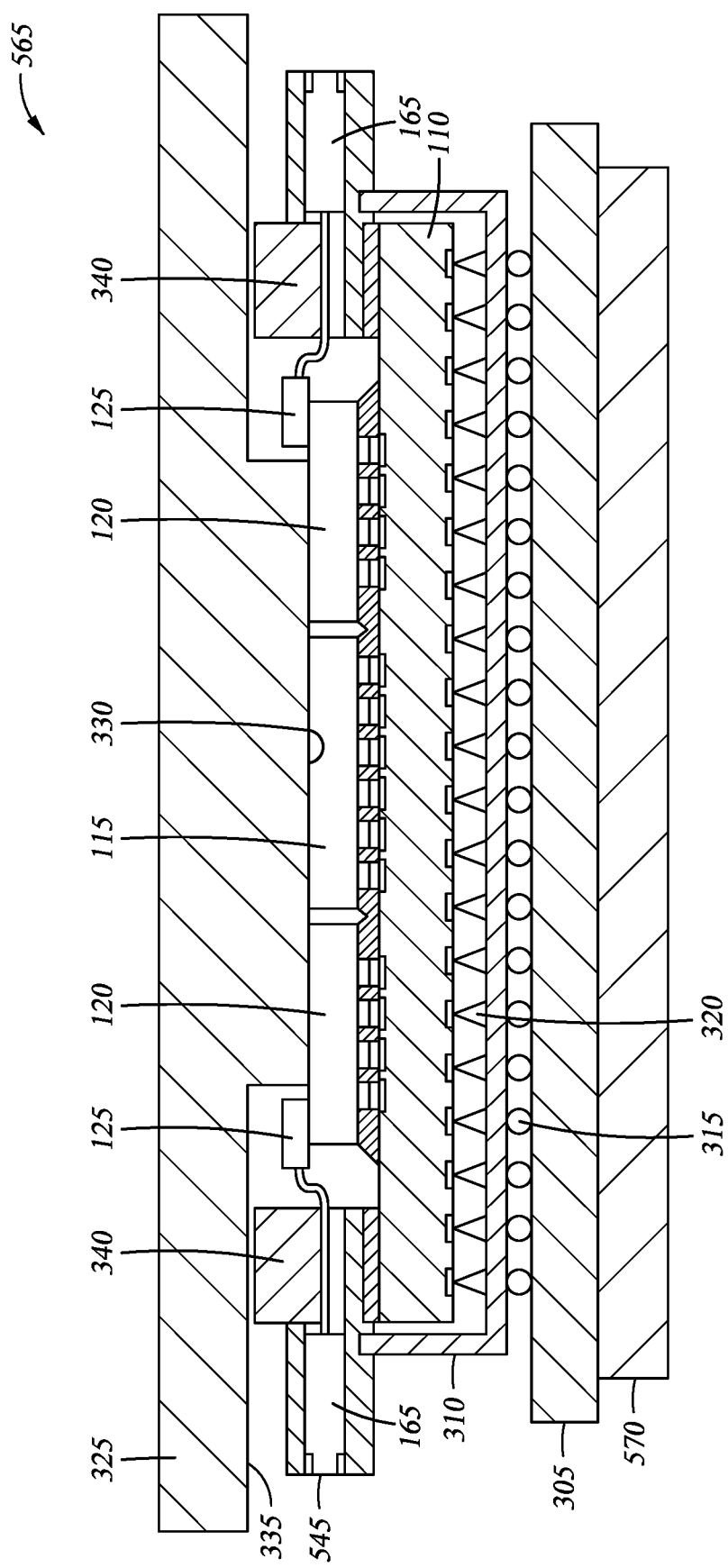

In diagram 565 of FIG. 5G, the load plate 340 is disposed above the inner stiffener ring 140, and the cooling plate 325 is disposed above the load plate 340, the electronic IC 115, and the one or more optical ICs 120. The first surface 330 of the cooling plate 325 contacts top surfaces of the electronic IC 115 and the one or more optical ICs 120. The second surface 335 of the cooling plate 325 contacts a top surface of the load plate 340. A back plate 570 is attached to the PCB 305.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. An apparatus comprising:
a substrate;
an electronic integrated circuit (IC) disposed on the substrate;
one or more optical ICs disposed on the substrate and communicatively coupled with the electronic IC; and
a stiffener device attached to the substrate, wherein the stiffener device comprises:
an inner stiffener ring that substantially circumscribes the one or more optical ICs; and
an outer stiffener ring that is attached to, and that substantially circumscribes, the inner stiffener ring,
wherein the stiffener device defines one or more features configured to receive a plurality of light-carrying media that optically couple with the one or more optical ICs and that extend to one or more lateral edges of the stiffener device.

2. The apparatus of claim 1, wherein the one or more features comprise:
a plurality of trenches extending from a top surface of the inner stiffener ring.

3. The apparatus of claim 2,
wherein the plurality of light-carrying media comprise one or both of optical fibers and flexible waveguides.

4. The apparatus of claim 3, wherein the plurality of light-carrying media are optically coupled with the one or more optical ICs using one or more fiber array units (FAUs) attached to the one or more optical ICs.

5. The apparatus of claim 1, wherein the outer stiffener ring has a first thickness that is greater than a second thickness of the inner stiffener ring.

6. The apparatus of claim 1, wherein the one or more features comprise:
a plurality of openings extending laterally through the outer stiffener ring to the one or more lateral edges of the stiffener device.

7. The apparatus of claim 6, wherein each opening of the plurality of openings is dimensioned to receive a respective optical connector that optically couples with one or more of the plurality of light-carrying media.

8. The apparatus of claim 7, wherein the outer stiffener ring comprises one or more alignment features at each opening for attaching the respective optical connector to the outer stiffener ring.

9. The apparatus of claim 1, further comprising:
a printed circuit board (PCB); and
a socket attached to the PCB and configured to receive the substrate,
wherein the inner stiffener ring is dimensioned to contact the socket when the substrate is received in the socket.

10. The apparatus of claim 9, wherein the stiffener device further comprises:
one or more alignment features configured to align the substrate when being received in the socket.

11. A method of fabricating an optical apparatus, the method comprising:
attaching a stiffener device to a substrate, wherein an electronic integrated circuit (IC) and one or more optical ICs are arranged on the substrate, wherein the stiffener device comprises:
an inner stiffener ring that substantially circumscribes the one or more optical ICs; and
an outer stiffener ring that is attached to, and that substantially circumscribes, the inner stiffener ring;
receiving a plurality of light-carrying media in one or more features defined in the stiffener device; and
optically coupling the plurality of light-carrying media to the one or more optical ICs,
wherein the plurality of light-carrying media extend, from the one or more optical ICs, toward one or more lateral edges of the stiffener device.

12. The method of claim 11,
wherein the one or more features comprise a plurality of trenches extending from a top surface of the inner stiffener ring.

13. The method of claim 11,
wherein the one or more features comprises a plurality of openings extending laterally through the outer stiffener ring to the one or more lateral edges of the stiffener device.

14. The method of claim 13, further comprising:
attaching one or more optical connectors to the outer stiffener ring at the plurality of openings; and
optically coupling the plurality of light-carrying media to the one or more optical connectors.

15. The method of claim 14, wherein attaching the one or more optical connectors comprises:
aligning the one or more optical connectors using one or more alignment features arranged at the plurality of openings.

16. The method of claim 11, further comprising:
inserting the substrate into a socket attached to a printed circuit board (PCB),
wherein the inner stiffener ring contacts the socket.

17. The method of claim 11, wherein optically coupling the plurality of light-carrying media to the one or more optical ICs comprises:
attaching the plurality of light-carrying media to one or more fiber array units (FAUs); and
attaching the one or more FAUs to the one or more optical ICs.

18. A stiffener device for a substrate having one or more integrated circuits (ICs) disposed on a surface of the substrate, the stiffener device comprising:
an inner stiffener ring dimensioned to substantially circumscribe the one or more ICs when the inner stiffener ring is attached to the surface; and
an outer stiffener ring that is attached to, and that substantially circumscribes, the inner stiffener ring,
wherein the outer stiffener ring defines one or more features that support one or more external connections to the one or more ICs through one or more lateral edges of the stiffener device.

19. The stiffener device of claim 18, wherein the one or more features comprise:
a plurality of trenches extending from a top surface of the inner stiffener ring,
wherein the outer stiffener ring has a first thickness that is greater than a second thickness of the inner stiffener ring.

20. The stiffener device of claim 19, wherein the one or more features comprise:
a plurality of openings extending laterally through the outer stiffener ring to the one or more lateral edges of the stiffener device.

* * * * *